A. E. SMITH.
HOBBY HORSE.
APPLICATION FILED FEB. 19, 1909.
948,257.
Patented Feb. 1, 1910.
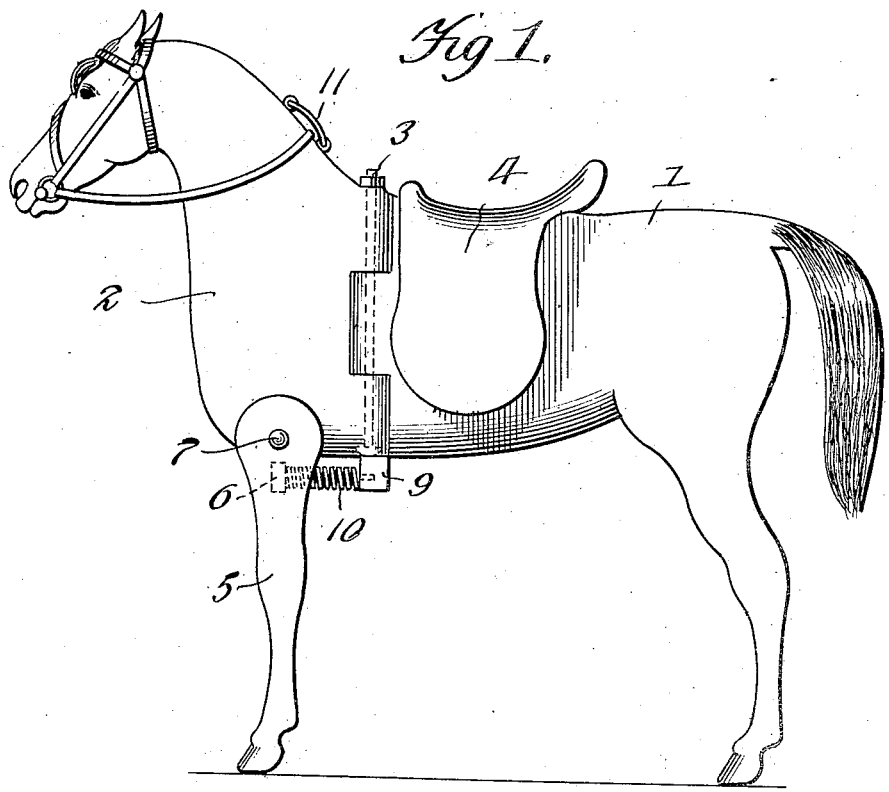
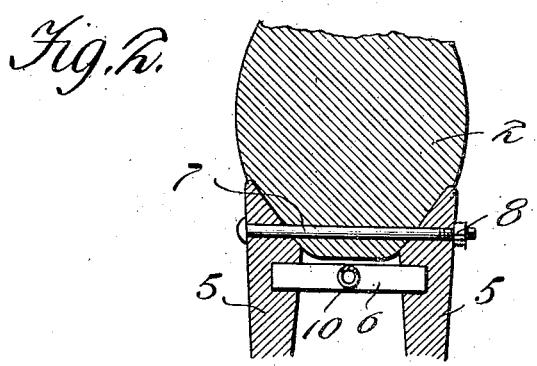
Witnesses
Hugh H. Ott
Inventor
Alfred E. Smith
By Victor J. Evans
Attorney

UNITED STATES PATENT OFFICE.

ALFRED E. SMITH, OF KELSO, WASHINGTON, ASSIGNOR OF ONE-HALF TO ISAAC H. HOWE, OF BELOIT, KANSAS.

HOBBY-HORSE.

948,257.   Specification of Letters Patent.   Patented Feb. 1, 1910.

Application filed February 19, 1909. Serial No. 478,846.

*To all whom it may concern:*

Be it known that I, ALFRED E. SMITH, a citizen of the United States of America, residing at Kelso, in the county of Cowlitz and State of Washington, have invented new and useful Improvements in Hobby-Horses, of which the following is a specification.

This invention relates to hobby horses, and one of the principal objects of the same is to provide simple means for propelling a horse, said means being actuated by the movements of the body of the rider.

Another object of the invention is to provide a hobby horse in which simple means for propelling the horse are connected to the front portion of the device, and means being provided whereby the hobby horse may be directed in its course of movements by the rider at will.

These and other objects may be attained by means of the construction illustrated in the accompanying drawing, in which,—

Figure 1 is a side elevation and partial section of a hobby horse made in accordance with my invention. Fig. 2 is a detail section illustrating the manner of mounting the front legs of the horse.

Referring to the drawing, the numeral 1 designates a hobby horse which may be of any suitable material and any required size. The front portion 2 of the hobby horse is preferably hollow and is connected to the rear portion by means of a pivot rod or pin 3, so that the front portion of the horse may swing laterally with relation to the rear portion thereof. A suitable saddle 4 may be placed upon the hobby horse. The front legs 5 are connected together by a cross bar 6, and said legs are properly spaced apart and pivoted upon a rod or bolt 7 passing through the front portion of the horse and provided with a nut 8 for securing said pin or bolt in place. The legs 5 are beveled on their upper ends to conform to the contour of the sides of the body portion 2 where said legs are pivoted on the rod or bolt 7. A cross bar 9 is secured under the body portion 2, and a spring 10 is connected at one end to said cross bar and attached at its opposite end to the cross bar 6. A suitable hand hold 11 is secured upon the neck portion of the hobby horse to be grasped by the rider for the purpose of operating the same.

The operation of my invention may be briefly described as follows: The rider seated upon the saddle 4 grasps the hand hold 11 and makes a backward movement to raise the front portion of the horse slightly from the ground. The stress of the spring 10 is exerted to throw the feet of the front legs outward, and when the rider makes a forward movement over the neck of the horse, the rear portion of the horse is slightly raised and brought forward. This movement being continued the horse is propelled over the ground. When it is desired to steer the horse to the right or the left the proper movement is made with the hand hold 11 to swing the front portion 2 to one side or the other upon the pivot 3.

My invention is of simple construction, can be manufactured at slight cost and can be operated by any person who can simulate the ordinary movements of a rider upon a galloping horse.

I claim:—

1. A hobby horse comprising a rear section and a front section pivotally connected together, means whereby said front section may be swung laterally with relation to the rear section for guiding the horse, legs pivoted to the front section, a cross bar connected to said legs, a bar connected to said front section, and a spring connected to said bars for throwing the front legs outward when raised from the ground by the rider.

2. A hobby horse provided with pivoted front legs, a cross bar connected near the upper ends of said legs, a bar connected to the body portion of the hobby horse, and a spring secured to said cross bar at one end and to said bar at the opposite end to normally throw the front feet outward when the front portion of the horse is raised from the ground by the rider.

3. A hobby horse comprising a front and a rear section pivotally connected together to permit the front section to be swung laterally relatively to the rear section, a hand hold connected to the front section for operating the same, front legs pivotally connected to the front section, a cross bar connected to said legs, a bar connected to the front section, and a spring connecting said bar and cross bar to normally throw the front legs outward.

In testimony whereof I affix my signature in presence of two witnesses.

ALFRED E. SMITH.

Witnesses:
CLYDE BASHOR,
SAM. COLINS.